I. T. JOHNS.
GREASE CUP.
APPLICATION FILED DEC. 24, 1910.
1,012,361. Patented Dec. 19, 1911.
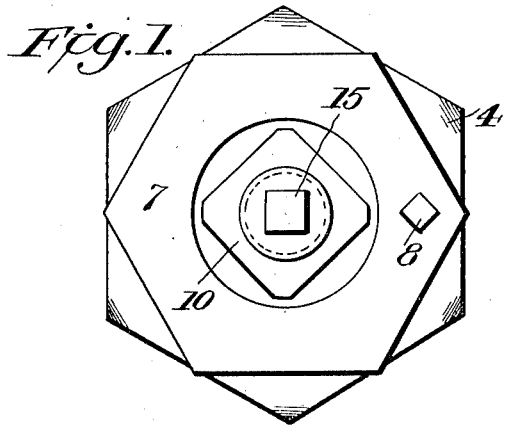
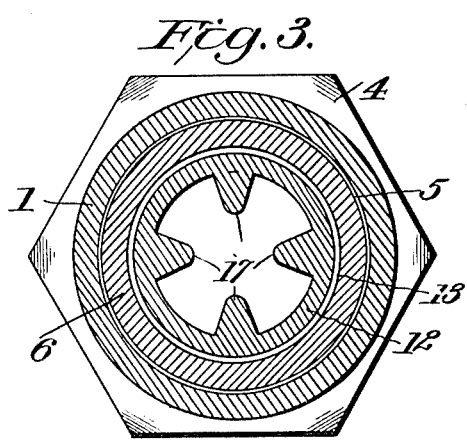
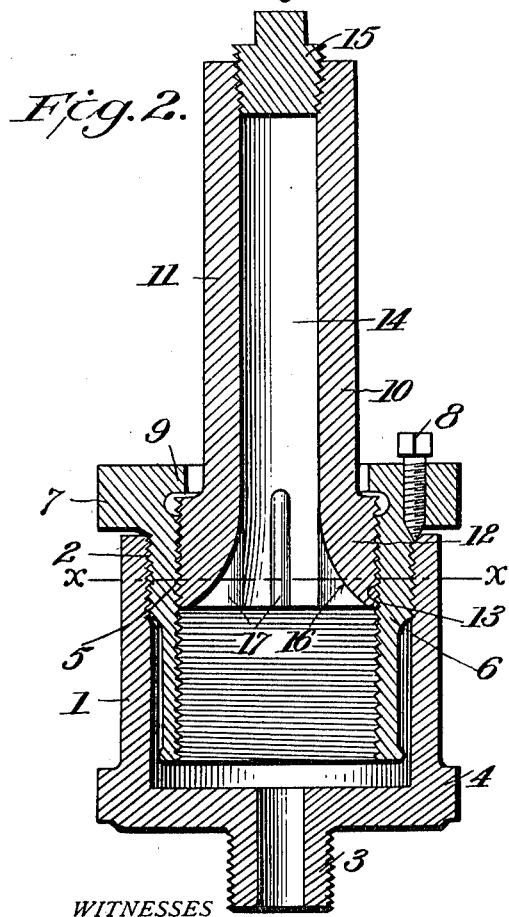
WITNESSES
INVENTOR
Isaac T. Johns,
By Edson Bro's, Attorneys.

UNITED STATES PATENT OFFICE.

ISAAC T. JOHNS, OF ST. JOSEPH, MISSOURI.

GREASE-CUP.

1,012,361. Specification of Letters Patent. Patented Dec. 19, 1911.

Application filed December 24, 1910. Serial No. 599,104.

*To all whom it may concern:*

Be it known that I, ISAAC T. JOHNS, a citizen of the United States, residing at St. Joseph, in the county of Buchanan and State of Missouri, have invented certain new and useful Improvements in Grease-Cups; and I do hereby declare the following to be a full, clear, and exact description of the invention, such as will enable others skilled in the art to which it appertains to make and use the same.

My invention relates to grease cups for lubricating crank pins and journals of locomotives.

The type of lubricator to which my invention belongs uses a hard grease very much like tallow as a lubricant. The grease is forced down upon the parts to be lubricated and when these parts become warm from friction, the heat thus generated melts the grease causing it to lubricate and cool the bearing. In order to keep the grease in the cup forced down into contact with the bearing as said grease is melted and used up, it is necessary to provide a grease cup of this kind with an adjustable plug.

One object of my invention is to avoid the danger of this plug becoming separated from the grease cup and lost while the locomotive is in motion.

Another object is to provide for more easily impelling the grease downward in the cup.

Further objects will become apparent from the following description.

The invention consists in the features of construction and combinations of parts hereinafter described, illustrated in the accompanying drawing, and specified in the appended claims.

In the accompanying drawing, illustrating the preferred embodiment of my invention: Figure 1 is a top plan view of the grease cup. Fig. 2 is a central vertical sectional view thereof, and Fig. 3 is a horizontal section on the line x—x of Fig. 2.

Referring more particularly to the drawing, 1 designates the body portion of the cup which is generally cylindrical in shape, open at the top, as at 2, and provided with a central restricted nozzle 3 at the bottom. The nozzle is preferably screw-threaded externally to engage the corresponding socket in the bearing, not shown. A portion of the external wall of the body portion of the cup is provided with a wrench surface 4 whereby the nozzle may be firmly seated in the bearing.

The upper edge of the open top of the body portion of the grease cup is screw-threaded internally, as at 5, to receive corresponding screw threads on the outer periphery of a bushing 6 which extends down nearly to the bottom of the body portion 1. The upper end of the bushing extends out over the top edge of the body portion, as at 7, and is provided with a wrench surface for screwing said bushing into the body portion. A pointed set screw 8 is fitted in this outwardly extending part of the bushing and serves to lock the latter to the body portion of the cup. The bushing is further screw-threaded internally from its bottom edge to near the top edge. At the top edge of the bushing, it is formed with an inwardly extending overhanging ledge 9 of less internal diameter than the screw-threaded portion of the bushing.

The plug 10, for feeding or impelling the grease downward in the cup, comprises a long squared shank 11 and an enlarged portion or base 12 at its lower end. This enlarged portion or base is screw-threaded, as at 13, to fit the screw thread on the inner surface of the bushing. The squared shank of the plug extends up through the opening within the overhanging ledge 9 on the bushing. Said overhanging ledge, being of smaller diameter than the enlarged portion or base of the plug, will prevent said plug from being screwed out of the top of the bushing. It will, therefore, be seen that it is impossible for the plug to become accidentally disconnected or jarred out of the cup when the latter is in use. The plug is, of course, inserted into the bushing through the bottom of the latter. It will be noted that the overhanging ledge retains the plug in the bushing and the set screw 8 locks the bushing to the body portion of the cup so that none of the parts can become lost. The plug is hollow, being provided with an opening 14 extending longitudinally therethrough. At its upper end, said plug is tapped to receive a one-half inch gas pipe plug 15. The opening in the plug is flared at its lower end, as at 16, and provided with inwardly extending longitudinal ribs 17, as illustrated in Figs. 2 and 3. These ribs become embedded in the grease and serve to hold the plug against reverse turning. Said ribs also aid in forcing the grease down in the cup by engaging it and imparting thereto a rotary movement as the plug is screwed down.

I do not limit myself to the particular proportions or sizes of the parts illustrated in the drawing, nor to the details of construction disclosed in this application. Rather do I reserve the right to make such changes as fairly fall within the scope of the appended claims.

I claim:

1. In a grease cup of the character described, the combination, with the body portion, of a hollow plug adjustable therein, means to close the upper end of said plug, the lower end of the opening through the plug being flared, and ribs in the flared portion of said opening for the purpose specified.

2. In a grease cup of the character described, the combination, with the body portion, of a bushing removably mounted therein, means to lock said bushing in the body, said bushing having screw threads on its inner surface and an overhanging ledge extending inwardly beyond said screw-threaded inner surface, and a plug comprising a shank, extending through the opening within the overhanging ledge on the bushing, and a screw-threaded enlargement engaging the screw threads on the inner surface of said bushing.

3. In a grease cup of the character described, the combination, with the body portion having a screw-threaded opening therein, of a bushing correspondingly screw-threaded to fit said opening, said bushing being provided at its outer end with an outward extension, projecting over the end of the body, and an overhanging flange extending inwardly beyond the main interior wall of the bushing, a set screw mounted in the outward projection on the bushing and adapted to lock the latter to the body, and a plug adjustably connected to the main inner surface of the bushing and having a portion extending through the opening within said overhanging ledge.

In testimony whereof, I affix my signature, in presence of two witnesses.

ISAAC T. JOHNS.

Witnesses:
ALEX T. WHELAN,
J. H. FOGARTY.

---

Copies of this patent may be obtained for five cents each, by addressing the "Commissioner of Patents, Washington, D. C."